(12) United States Patent
Rosmarin et al.

(10) Patent No.: US 9,409,298 B2
(45) Date of Patent: Aug. 9, 2016

(54) FLEXURE ELEMENTS FOR SERIES ELASTIC ACTUATORS AND RELATED METHODS

(75) Inventors: Josiah Rosmarin, Cambridge, MA (US); Ben Berkowitz, Sharon, MA (US)

(73) Assignee: Rethink Robotics, Inc., Boston, MA (US)

( * ) Notice: Subject to any disclaimer, the term of this patent is extended or adjusted under 35 U.S.C. 154(b) by 910 days.

(21) Appl. No.: 13/446,564

(22) Filed: Apr. 13, 2012

(65) Prior Publication Data

US 2013/0275060 A1 Oct. 17, 2013

(51) Int. Cl.
*G01L 3/00* (2006.01)
*B25J 13/08* (2006.01)
*B25J 9/16* (2006.01)
*B25J 17/00* (2006.01)
*G01L 25/00* (2006.01)

(52) U.S. Cl.
CPC .............. *B25J 13/085* (2013.01); *B25J 9/1633* (2013.01); *B25J 17/00* (2013.01); *G01L 25/00* (2013.01)

(58) Field of Classification Search
USPC ............................................... 702/43; 73/849
See application file for complete search history.

(56) References Cited

U.S. PATENT DOCUMENTS

| | | | |
|---|---|---|---|
| 3,595,123 A * | 7/1971 | Wurzel | F16B 21/186 411/517 |
| 3,665,482 A | 5/1972 | Cresswell | |
| 4,099,409 A | 7/1978 | Edmond | |
| 4,183,280 A * | 1/1980 | Hashimoto | 411/518 |
| 4,189,951 A | 2/1980 | Sauter | |
| 4,528,862 A | 7/1985 | Goldowsky | |
| 4,550,626 A | 11/1985 | Brouwer | |
| 4,714,388 A | 12/1987 | Siler | |
| 4,729,258 A | 3/1988 | Mohri et al. | |
| 4,739,670 A | 4/1988 | Tomita et al. | |
| 4,804,304 A | 2/1989 | Tellden | |
| 4,828,453 A | 5/1989 | Martin et al. | |
| 5,083,896 A | 1/1992 | Uehara et al. | |
| 5,138,747 A * | 8/1992 | Oetiker | 24/20 R |
| 5,138,904 A | 8/1992 | Lande et al. | |
| 5,517,874 A | 5/1996 | Janiszewski | |
| 5,540,630 A | 7/1996 | Vranish | |
| 5,584,647 A | 12/1996 | Uehara et al. | |
| 5,650,704 A | 7/1997 | Pratt et al. | |
| 5,910,720 A | 6/1999 | Williamson et al. | |
| 6,148,684 A | 11/2000 | Gardiner | |
| 6,258,002 B1 | 7/2001 | Lippitsch | |
| 6,536,503 B1 | 3/2003 | Anderson et al. | |

(Continued)

FOREIGN PATENT DOCUMENTS

| | | |
|---|---|---|
| CN | 104245247 | 12/2014 |
| EP | 0355083 A1 | 2/1990 |

(Continued)

OTHER PUBLICATIONS

International Application Serial No. PCT/US2013/035704, International Search Report and Written Opinion mailed on Feb. 25, 2014, 8 pages.

(Continued)

*Primary Examiner* — Paul D Lee
(74) *Attorney, Agent, or Firm* — Morgan, Lewis & Bockius LLP (57) ABSTRACT

An arcuate metal element for detecting a rotary force and generating a deformation in response thereto.

19 Claims, 6 Drawing Sheets

(56) References Cited

U.S. PATENT DOCUMENTS

| | | |
|---|---|---|
| 6,968,884 B2 | 11/2005 | Anderson et al. |
| 6,997,076 B2 | 2/2006 | Menjak et al. |
| 7,086,302 B2 | 8/2006 | Ask et al. |
| 7,088,012 B2 | 8/2006 | Gizara |
| 7,121,973 B2 | 10/2006 | Lumpkin et al. |
| 7,191,675 B2 | 3/2007 | Ho |
| 7,261,667 B2 | 8/2007 | Berger |
| 7,311,133 B2 | 12/2007 | Anderson et al. |
| 7,364,145 B2 | 4/2008 | Knirck et al. |
| 7,605,488 B2 | 10/2009 | Rebsdorf |
| 7,673,536 B2 | 3/2010 | Tamura et al. |
| 7,802,608 B2 | 9/2010 | Anderson et al. |
| 8,686,680 B2 | 4/2014 | Deegan |
| 2002/0121152 A1 | 9/2002 | White et al. |
| 2003/0015051 A1 | 1/2003 | Nomura et al. |
| 2004/0089089 A1 | 5/2004 | Stevens et al. |
| 2005/0005725 A1 | 1/2005 | Chang et al. |
| 2005/0028426 A1 | 2/2005 | Blette et al. |
| 2005/0284246 A1 | 12/2005 | Faeth |
| 2006/0249315 A1 | 11/2006 | Herr et al. |
| 2007/0179011 A1 | 8/2007 | Choi et al. |
| 2007/0295136 A1 | 12/2007 | Fleming |
| 2008/0056858 A1 | 3/2008 | Tamura et al. |
| 2008/0288088 A1 | 11/2008 | Langenfeld et al. |
| 2009/0314114 A1 | 12/2009 | Grosberg |
| 2010/0181955 A1 | 7/2010 | Maeda et al. |
| 2010/0231158 A1 | 9/2010 | Jonsson |
| 2010/0310200 A1 | 12/2010 | Kosmowski |
| 2011/0000628 A1 | 1/2011 | Anderson et al. |
| 2011/0067517 A1 | 3/2011 | Ihrke et al. |
| 2011/0071680 A1 | 3/2011 | Davis et al. |
| 2011/0190934 A1 | 8/2011 | Reiland et al. |
| 2012/0312114 A1* | 12/2012 | Deegan .......................... 74/409 |

FOREIGN PATENT DOCUMENTS

| | | |
|---|---|---|
| EP | 0505140 A1 | 9/1992 |
| JP | 60-40866 A | 3/1985 |
| WO | 2008015460 A2 | 2/2008 |
| WO | 2008142131 A2 | 11/2008 |
| WO | 2013155031 A2 | 10/2013 |
| WO | 2013155031 A3 | 10/2013 |

OTHER PUBLICATIONS

Robertez et al., "Precise Robot Motions Using Dual Motor Control", IEEE International Conference on Robotics and Automation (ICRA), 2010, pp. 5613-5620.

PCT International Application No. PCT/US2013/035704, International Preliminary Report on Patentability mailed Oct. 23, 2014, 9 pages.

Examination Report Received for European Patent Application No. 13728552.4 mailed on Dec. 23, 2014, 2 pages.

PCT International Application No. PCT/US2013/035704, Invitation to Pay Additional Fees and Partial Search Report mailed on Oct. 17, 2013, 5 pages.

Chinese Office Action dated May 28, 2015, Chinese Patent Application No. 201380019809.2, "Flexure Elements for Series Elastic Actuators and Related Methods", Applicants Rethink Robotics, Inc; Rosmarin, Josiah; Berkowitz, Ben.

* cited by examiner

FLEXURE ELEMENTS FOR SERIES ELASTIC ACTUATORS AND RELATED METHODS

FIELD OF THE INVENTION

Embodiments of the present invention generally relate to series elastic actuators (SEAs) and, in particular, to SEAs that have low cost of manufacture and minimize energy loss during robotic operations.

BACKGROUND

Robots are designed to manipulate objects and interact with the environment. Safely detecting and controlling the forces that robotic actuators apply to robotic elements and/or the environment prevents unnecessary hazards. Traditionally, stiff actuators have been utilized to generate large forces/torques that can be measured by force sensors. Forces exerted by the stiff actuators, however, are difficult to measure precisely: small errors in the detected sensor deflections may result in large force errors. Therefore, expensive high-precision force sensors may be required to cooperatively work with the stiff actuators. In addition, stiff actuators are generally incapable of absorbing shock loads, thereby limiting their applications in a robotic system.

Figure 1:
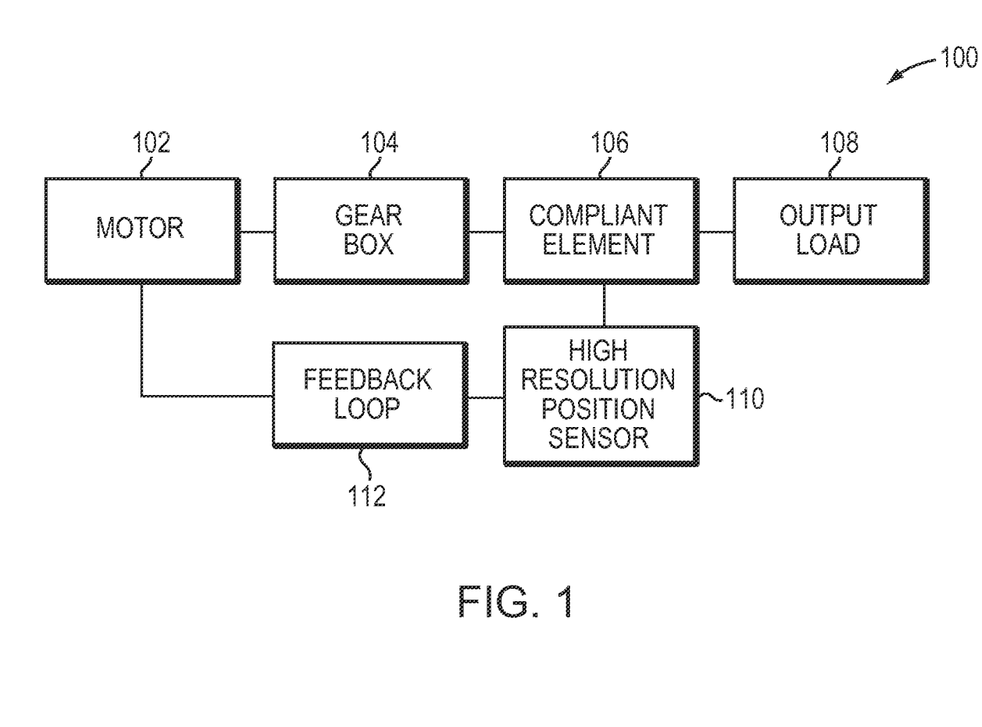
FIG. 1 schematically illustrates a compliant element implemented in an actuator of a robotic system.

SEAs provide an economically viable approach to more accurately detect and control the robotic forces. SEAs typically employ a compliant element between a robotic gearbox and a driven load, as shown in FIG. 1, to reduce the stiffness of the actuator. Because the SEA has a relatively high compliance, its deflection in response to a force/torque is large and thus easy to measure. Force calculations based on the position deflection using, for example, Hooke's law thus have high accuracy. A highly compliant SEA reduces the sensitivity of the actuator to small changes in the position deflection of SEA; a feedback loop can be implemented to precisely control the actuator to a desired output force/torque.

A number of configurations, including torsion springs, extension springs, planar flexural elements and other elastic elements, have been used as the compliant element in SEAs. Torsion springs in general do not provide sufficient stiffness; deflections of the torsion spring may be large and result in errors in the force measurements due to the non-linear relationship between the force and the deformation for large deflections. Additionally, large deformations may significantly increase Coulomb friction and/or other non-conservative forces, thereby consuming extra energy. Extension springs typically generate significant friction due to sliding motion at the end regions of the spring. Planar flexural elements can provide the desired stiffness and element deflections; however, fabrication methods for these elements are usually expensive and the applied force may be distributed inhomogeneously thereon, resulting in a permanent deformation or fatigue failure of parts of the element.

Consequently, it remains a challenge to design a compliant SEA that is manufactured inexpensively, has limited energy loss (due to, e.g., friction) and strikes an optimal balance between a desired stiffness and a detectable position deflection while not exceeding the fatigue limit (or linear force regime) of the material.

SUMMARY

In various embodiments, the present invention relates to an arcuate metal flexural element that is well-suited to robotic applications, e.g., for detecting forces between robotic elements (such as the joints) and/or between robots and the environment. The arcuate flexural element may generate a uniform stress or deformation upon an applied force and exhibits low energy loss. A flexure element in accordance herewith may have a non-uniform cross-sectional dimension (typically width) over the length so that an applied force is distributed homogeneously thereon. More specifically, two terminating ends of the flexure element may have a wider cross-sectional width whereas a middle portion of the flexure element may have a narrower cross-sectional width. The two end regions may be tightly clamped onto rotary robotic elements (e.g., a gearbox arm or a joint output). As a result, there is no sliding motion at the end regions of the flexure element and the kinetic friction is thereby significantly reduced. Additionally, because only the two end regions on the flexure are attached to the robotic elements, there is no presence of frictions and thus no energy consumption in other parts thereof. A "single stamping" technique may be used to produce flexure elements as described herein, thereby reducing the cost of manufacture; alternatively, the flexure element may be produced using a "progressive die stamping" technique that combines multiple manufacturing processes (e.g., punching, coining, and cutting) to increase manufacturing efficiency and economy.

Accordingly, in one aspect, the invention pertains to an actuator in a robotic system. In various embodiments, the actuator includes a motor for driving a load, a gear train for transmitting a force from the motor to the load, and an arcuate metal element for detecting the force and undergoing a deformation in response thereto. The deformation of the arcuate metal element upon applying the force may be uniform along a length thereof. The actuator may further include components that define a joint, e.g., a bend joint or a twist joint. The arcuate metal element may be or include a C-shaped open ring subtending an angle larger than 180°. In various embodiments, the arcuate metal element has a varying cross-sectional dimension and the arcuate element terminates in first and second ends, each of which includes means (e.g., through-holes) for facilitating clamping of the element. Additionally, the arcuate element may be configured such that a segment between the first and second ends is suspended free from contact with any other component.

The actuator in the robotic system may further include a second arcuate metal element for detecting the force and undergoing a deformation in response thereto; the elements may be stacked. In some embodiments, the second element has a varying cross-sectional dimension along a length thereof and also undergoes a uniform deformation in response to the force.

In a second aspect, the invention relates to a flexure element that includes a single planar arcuate segment terminating in first and second ends and defining an open ring. The element is configured for substantially in-plane displacement in response to an in-plane rotary force applied against at least one of the ends. Each of the ends may include means (e.g., through-holes) for facilitating clamping of the flexure element. The open ring of the element may subtend an angle larger than 180°. In various embodiments, the flexure element consists essentially of spring steel. In some embodiments, the cross-sectional dimension of the flexure element is non-uniform over its length to eliminate stress concentrations during displacement. The cross-sectional dimension may monotonically decrease from the first and second ends to a middle therebetween. In one embodiment, the monotonic decrease is 60%.

In a third aspect, the invention relates to a method of detecting a force transmitted from a motor to a load in a robotic system. The method includes (i) generating, in response to the force, a deformation on an arcuate element and (ii) computing the force based at least in part on the deformation. In various embodiments, the deformation of the arcuate element is uniform along a length thereof. In some embodiments, the arcuate element has a length and the cross-sectional dimension is non-uniform over the length, whereby stress concentrations are eliminated during displacement due to the force. The cross-sectional dimension may monotonically decrease from the first and second ends of the arcuate element to a middle therebetween. In one embodiment, the monotonic decrease is 60%.

As used herein, the terms "substantially" and "approximately" mean ±10% or ±10°, and in some embodiments, ±5% or ±5°. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Refer again to FIG. 1, which illustrates a robotic actuator 100 having a motor 102, a gearbox 104, a compliant element (e.g., a SEA) 106, and an output load 108 coupled in series. The gearbox 104 is configured to transfer motion from the associated motor 102 to motion of the output load 108 via the compliant element 106. The load 108 may be any suitable load, such as a robotic link or joint. The position deflection of the compliant element 106 may be measured by a position sensor 110. If the stiffness constant (e.g., spring constant or Young's modulus) is known, the applied force/torque of the motor 102 may be determined. A feedback force/torque loop 112 may be implemented such that a desired force/torque is generated by the motor 102 and transmitted through the compliant element 106.

Figure 2A:
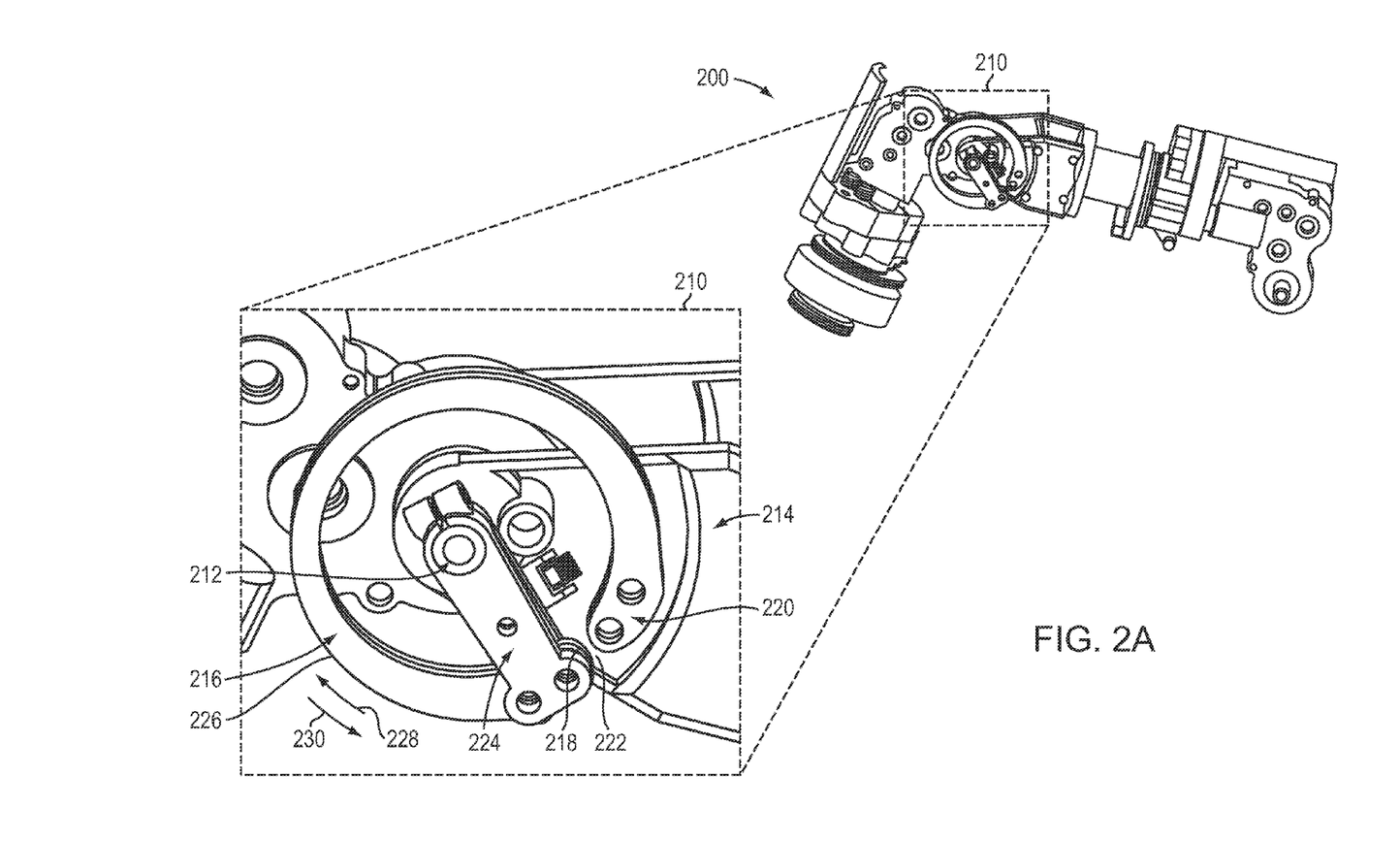
FIG. 2A is a perspective view of an embodiment of a SEA flexure disposed within a bend joint.

FIG. 2A depicts a portion 200 of a robotic system including a bend joint 210 in accordance with an embodiment of the invention. In the illustrated configuration, a gearbox output shaft 212 transfers force/torque from the motor (not shown) to the bend joint output 214 via a compliant element (e.g., a SEA flexure) 216. The SEA flexure 216 may be configured as a planar arcuate element terminating at two end regions 218, 220 to accommodate the bend joint 210. The two end regions 218, 220 may be in contact with one another or have an opening 222 therebetween. The end region 218 includes two through-holes aligned with through-holes in a gearbox-SEA arm 224, facilitating engagement therebetween. The other end of the gearbox-SEA arm is affixed to the gearbox shaft 212. Similarly, the end region 220 of the SEA flexure 216 has through-holes facilitating engagement to the bend joint output 214. The gearbox-SEA arm 224 and the bend joint output 214 may engage the SEA flexure 216 by a facilitating means for clamping the SEA flexure 216. The facilitating means may be, for example, a set screw, a pinch dog and/or other fastening devices that facilitate tight, secure mechanical coupling. Because the SEA flexure 216 is tightly clamped at the two end regions 218, 220, there is no significant sliding motion in the engagement region. As a result, the friction between the secured SEA flexure 216 and the gearbox-SEA arm 224 and/or the bend joint output 214 is negligible and the energy loss in the bend joint 210 is minimized. The SEA flexure 216 may further be configured such that, as illustrated, a segment 226 of the SEA flexure 216 (desirably a majority of its length) is not in contact with other robotic components and thus generates no friction during bending. Accordingly, the SEA flexure 216 minimizes the energy consumption associated with transmitting force/torque from the motor to the load, i.e., the bend joint 210. The SEA flexure 216 may be a C-shaped open ring subtending an angle larger than 180°. In one embodiment, the subtended angle of the C-shaped open ring is between 270° and 300°.

Figure 2B:
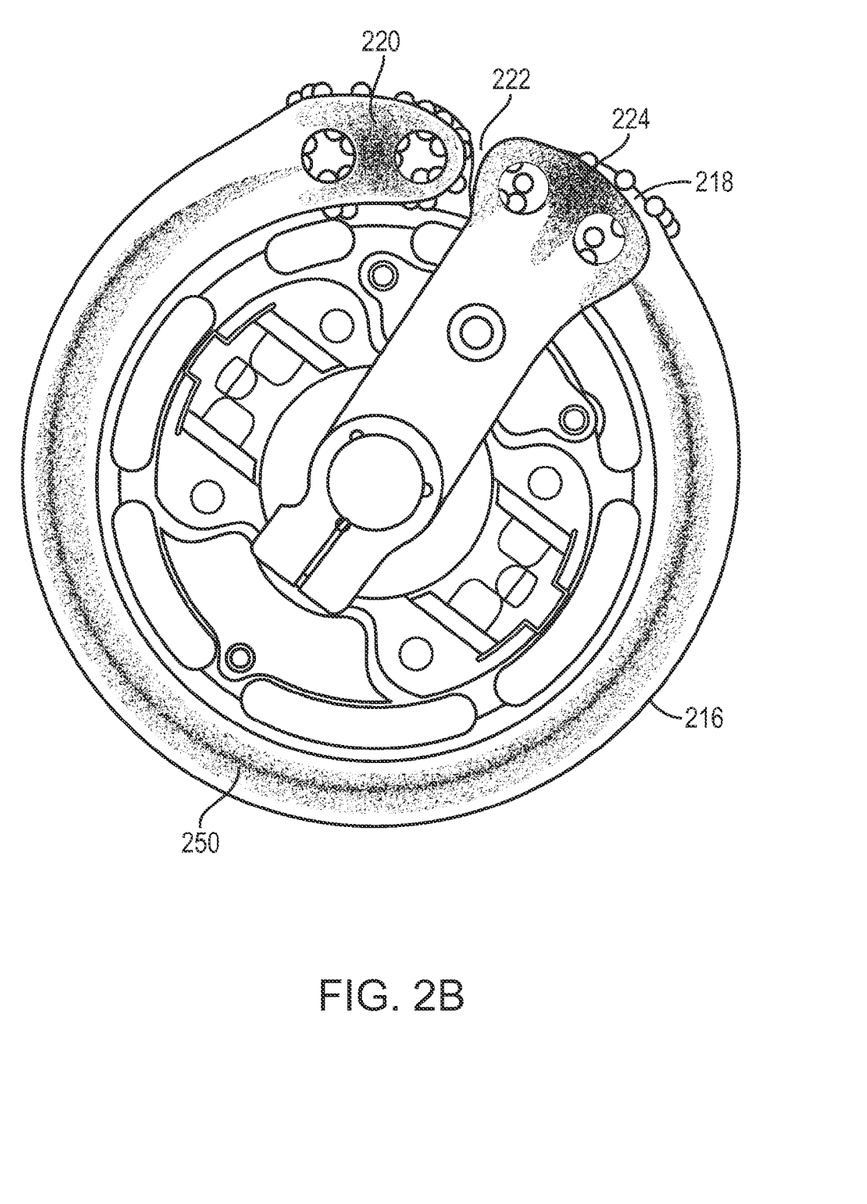
FIGS. 2B and 2C are plan views illustrating an opening in the SEA flexure diminished and increased, respectively, upon applying a force/torque.
Figure 2C:
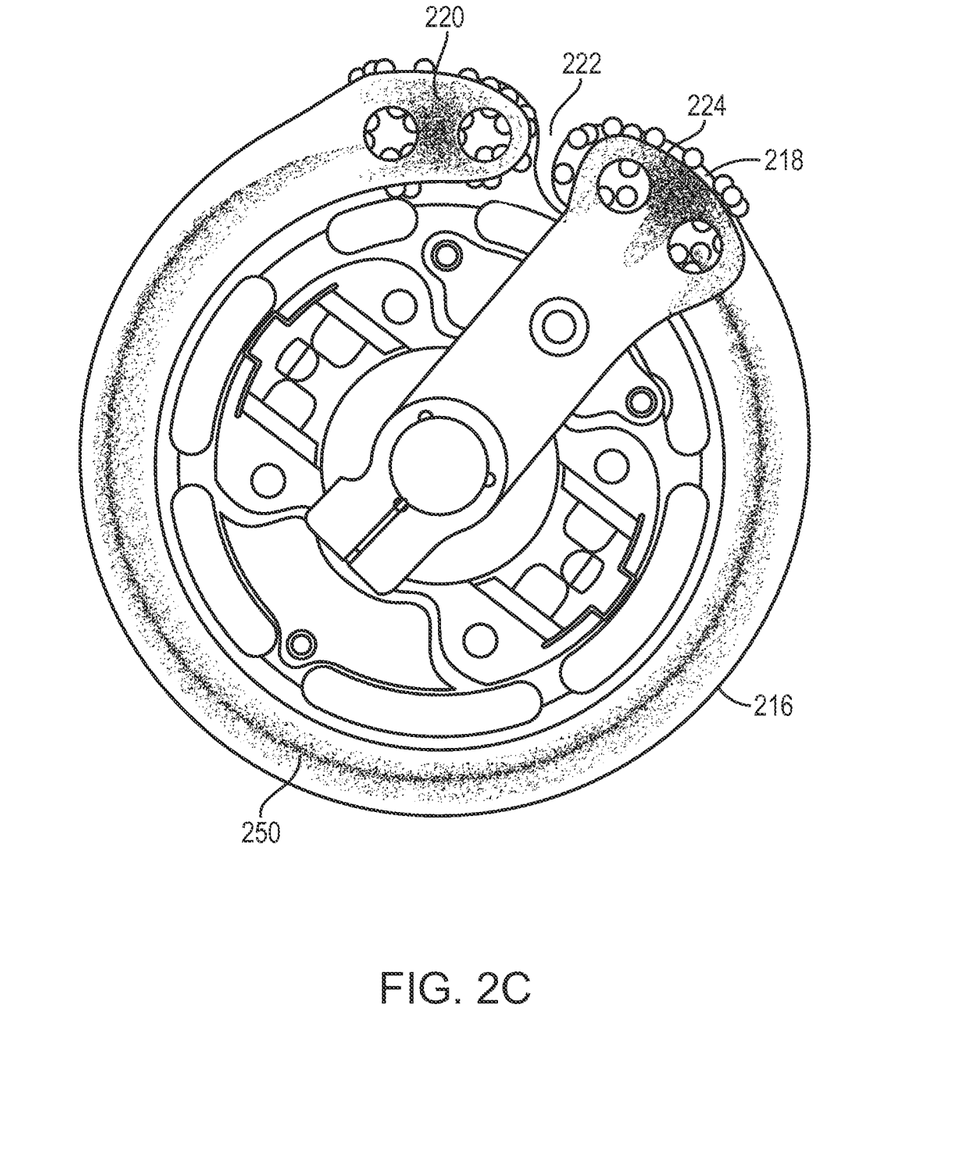

Transmitting force/torque from the motor to the bend joint output 214 via the tightly clamped end regions 218, 220 results in a substantially in-plane deflection of the SEA flexure 216. For example, upon experiencing an applied clockwise torque 228 that increases the degree of bending of the joint 210, the SEA flexure 216 is deflected such that the opening 222 is diminished, as depicted in FIG. 2B. Similarly, a counterclockwise torque 230 increases the opening 222 of the SEA flexure 216, as illustrated in FIG. 2C. The position deflection of the SEA flexure 216 may be measured by a position sensor (not shown). Because the stiffness of the SEA flexure 216 is determined only by the material, the applied torque can then be computed based on the measured position deflection. If the SEA flexure 216 is made of a stiff material (e.g., having a large Young's modulus), a high-resolution position sensor is necessary to accurately detect the deflection, whereas a less sensitive position sensor is required to measure a larger deflection of a less stiff material. A stiff material may have a relatively limited linear regime in which Hooke's law is applicable; beyond the linear regime, the nonlinear force-deformation relationship may require a complex calculation to determine the applied force/torque, and may further result in permanent damage to the flexure. In one embodiment, the SEA flexure 216 is made of spring steel that incorporates various carbon concentrations to generate a high yield strength (typically larger than 60 ksi); this allows a large position deflection of the SEA flexure 216 while not exceeding its material strength (i.e., linear regime) such that the SEA flexure 216 returns to its original shape upon removal of the applied force/torque despite significant bending; that is, the SEA flexure 216 exhibits low hysteresis, e.g., approximately 2% or less. The SEA flexure 216 thus balances a desired stiffness (e.g., 3 Nm/degree) with flexure deflection (e.g., 5°) that may be easily measured while not exceeding the fatigue limit (or regime having the linear force-deformation relationship) of the material. Other materials, such as carbon fiber, that have a suitable stiffness for robotic applications and generate substantially measurable position deflections may be used for the SEA flexure 216 and are within the scope of the current invention.

Figure 3:
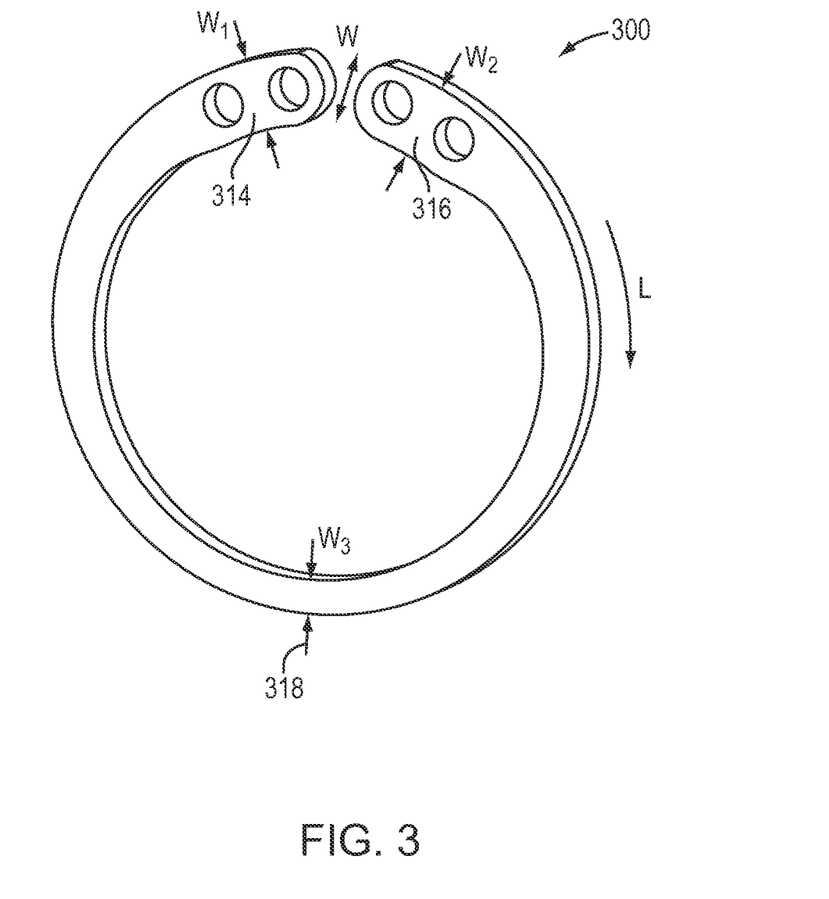
FIG. 3 is a perspective view depicting the cross-sectional width of the SEA flexure varying along its length.

Referring to FIG. 3, the SEA flexure 300 may have a non-uniform cross-sectional width W over the flexure length L to generate a uniformly distributed stress therealong in response to an applied force/torque. The stress distribution is illustrated schematically at 250 in FIGS. 2B and 2C, and as shown, stress is not concentrated at any point around the flexure 216. For example, the cross-sectional widths $W_1$ and $W_2$ near the two end regions 314, 316, respectively, may be larger than the cross-sectional width $W_3$ at the middle of the SEA flexure 300. In one embodiment, the cross-sectional widths $W_1$ and $W_2$ of the two end regions are the same. In some embodiments, the cross-sectional width W monotonically decreases from the two end regions 314, 316 to the midpoint therebetween. The monotonic decrease may be substantially symmetric and, for example, represent approximately a 60% decrease in the thickness W (i.e., $W_3/W_1 = W_3/W_2 = 0.6$). Because the two clamped end regions 314, 316 are subjected to the largest force and this force decreases along the length of the SEA flexure 300, the middle segment 318 experiences the smallest applied force. Therefore, structural designs of the SEA flexure 330 having a wider cross-sectional width at the end regions 314, 316 and a narrower cross-sectional width in the middle 318 generate a uniform strain (and thus stress) along the entire length L of the SEA flexure 300. Varying the cross-sectional width W along the length of the SEA flexure 300 advantageously eliminates stress concentrations at specific weak points thereon and thus effectively maximizes the lifetime of the SEA flexure 300. Reducing the cross-sectional width in the middle segment reduces the stiffness of the SEA flexure 300, thereby allowing a large position deflection thereof (or less sensitivity). Additionally, the reduced cross-sectional width of the SEA flexure 300 decreases the system size, weight, and cost.

Although the SEA flexure may have varying cross-sectional width W along a length thereof, the present invention is not limited to any particular designs. One of ordinary skill in the art will understand that the cross-sectional width may be modified in any manner to generate a uniform deformation or stress along the entire length of the SEA flexure. For example, the cross-sectional width may decrease non-linearly from the two end regions 314, 316 to the midpoint 318; the decrease may be asymmetric from both ends; and the cross-sectional width $W_1$ of end region 314 may be different from the cross-sectional width $W_2$ of end region 316.

Figure 4:
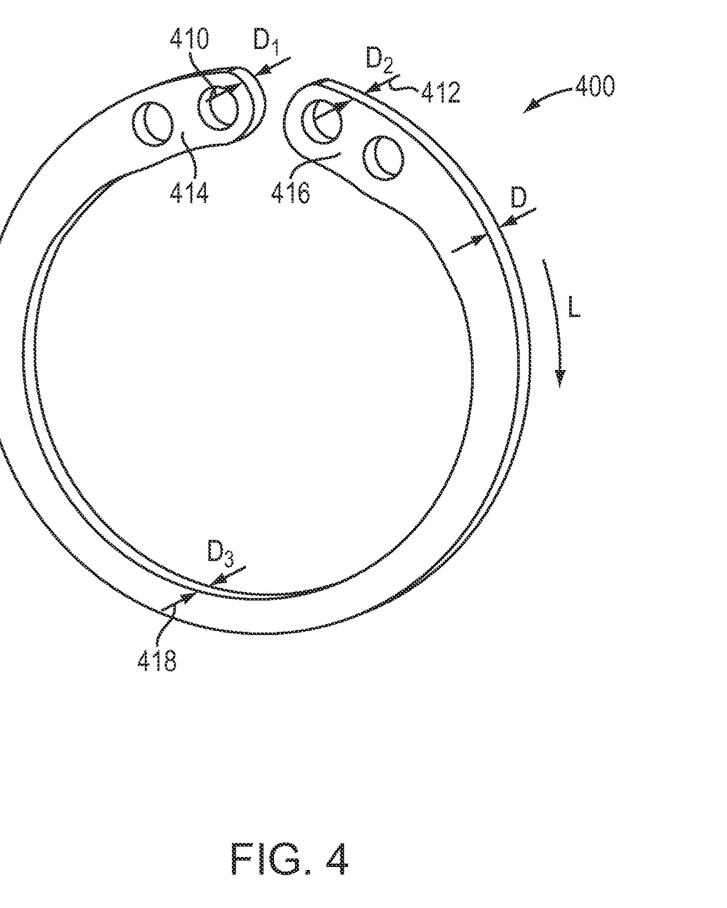
FIG. 4 is a perspective view depicting the cross-sectional thickness of the SEA flexure varying along its length.

As depicted in FIG. 4, the cross-sectional thicknesses $D_1$ and $D_2$ of the two end regions 414, 416, respectively, may be thicker than the cross-sectional thickness $D_3$ 418 in the middle segment of the SEA flexure 400. The cross-sectional thickness D of the SEA flexure 400 may monotonically or non-linearly decrease from the two end regions 414, 416 to the middle segment 418 therebetween. The decrease may be symmetric or asymmetric and the cross-sectional thicknesses $D_1$ and $D_2$ may be the same or different. The SEA flexure 400 may transmit the force/torque to a linked robotic component (e.g., the bend joint output) and generate a uniformly distributed stress or deformation along the length L in response to an applied force/torque. In other embodiments, the cross-sectional width W and thickness D along the length of the SEA flexure both vary. The variation from two end regions may be symmetric or asymmetric. Upon exerting a force/torque on the two clamped end regions, a homogeneously distributed strain or stress along the entire flexure length L of the SEA flexure may be achieved using any combination of varying cross-sectional width W and thickness D. Any structural designs that may effectively eliminate stress concentrations within the SEA flexure and thereby generate uniform deformations are within the scope of the current invention.

In some embodiments, multiple SEA flexures 216 may be stacked on top of each other to cooperatively transmit the driving force/torque. The varying cross-sectional width of each layer may be the same or different. Advantages of utilizing multiple SEA layers may include, for example, decreasing the overall stiffness of the multilayer SEA flexures and thus increasing the detectable flexure deformations while retaining the stiffness of each SEA flexure 216. In some embodiments, the SEA flexure 216 is manufactured using a "single stamping" technique, whereby a single step of stamping the designed dimensions of the SEA flexure 216 on a piece of sheet metal is performed using a stamping press; this manufacturing approach is easy, fast, and cost effective. In other embodiments, a "progressive die stamping" technique that utilizes a series of stamping stations to perform simultaneous operations, such as, punching, coining, bending, and cutting, on sheet metal may be used to form the SEA flexure 216 for efficiency and economy.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An actuator in a robotic system comprising:
a motor for driving a load;
an arcuate metal element; and
a gear train for transmitting a force from the motor to the load solely via the arcuate metal element,
wherein the arcuate metal element detects the force and undergoes a deformation in response thereto, and
wherein (i) the arcuate metal element is a single planar arcuate segment terminating in first and second ends and defining an open ring, and configured for substantially in-plane displacement, within a plane of flexure, in response to an in-plane rotary force applied against at least one of the ends, and (ii) the arcuate metal element has a width, within the plane of flexure, that is greater than a cross-sectional thickness of the arcuate metal element perpendicular to the plane of flexure.

2. The actuator of claim 1, further comprising components defining a joint, wherein the joint is a bend joint or a twist joint.

3. The actuator of claim 1, further comprising a second arcuate metal element for detecting the force and undergoing a deformation in response thereto, wherein the elements are stacked and the force is transmitted from the motor to the load via the arcuate metal element and the second arcuate metal element.

4. The actuator of claim 3, wherein the second element has a varying cross-sectional dimension along a length thereof and also undergoes a uniform deformation in response to the force, the cross-sectional dimension being selected from the group consisting of a width within the plane of flexure and a thickness perpendicular to the plane of flexure.

5. The actuator of claim 1, wherein the arcuate metal element comprises a C-shaped open ring subtending an angle larger than 180°.

6. The actuator of claim 1, wherein the deformation of the arcuate metal element in response to the force is uniform along an entire length thereof.

7. The actuator of claim 1, wherein the arcuate metal element comprises a cross-sectional dimension that varies along a length of the arcuate metal element, the cross-sectional dimension being selected from the group consisting of a width within the plane of flexure and a thickness perpendicular to the plane of flexure.

8. The actuator of claim 1, wherein the arcuate element terminates in first and second ends, each of the ends comprising means for facilitating clamping of the element.

9. The actuator of claim 8, wherein the arcuate element is configured such that an entire length of the arcuate element between the first and second ends is suspended free from contact with any other component.

10. An actuator in a robotic system comprising:
a motor for driving a load;
an arcuate metal element; and
a gear train for transmitting a force from the motor to the load solely via the arcuate metal element,
wherein the arcuate metal element detects the force and undergoes a deformation in response thereto, and
wherein the arcuate metal element comprises a C-shaped open ring subtending an angle larger than 180°.

11. An actuator in a robotic system comprising:
a motor for driving a load;
an arcuate metal element; and
a gear train for transmitting a force from the motor to the load solely via the arcuate metal element,
wherein the arcuate metal element detects the force and undergoes a deformation in response thereto, and
wherein the deformation of the arcuate metal element in response to the force is uniform along an entire length thereof.

12. An actuator in a robotic system comprising:
a motor for driving a load;
an arcuate metal element; and
a gear train for transmitting a force from the motor to the load solely via the arcuate metal element,
wherein the arcuate metal element detects the force and undergoes a deformation in response thereto within a plane of flexure, and
wherein the arcuate metal element comprises a cross-sectional dimension that varies along a length of the arcuate metal element, the cross-sectional dimension being selected from the group consisting of a width within the plane of flexure and a thickness perpendicular to the plane of flexure.

13. An actuator in a robotic system comprising:
a motor for driving a load;
an arcuate metal element; and
a gear train for transmitting a force from the motor to the load solely via the arcuate metal element,
wherein the arcuate metal element detects the force and undergoes a deformation in response thereto, and
wherein the arcuate element terminates in first and second ends, each of the ends comprising means for facilitating clamping of the element.

14. The actuator of claim 13, wherein the arcuate element is configured such that an entire length of the arcuate element between the first and second ends is suspended free from contact with any other component.

15. A method of detecting a force transmitted from a motor to a load in a robotic system, the method comprising:
generating, in response to the force, a deformation on an arcuate element, wherein the force is transmitted from the motor to the load solely via the arcuate element;
computing the force based at least in part on the deformation; and
feedback-controlling the motor based at least in part on the computed force,
wherein (i) the arcuate element is a single planar arcuate segment terminating in first and second ends and defining an open ring, and configured for substantially in-plane displacement, within a plane of flexure, in response to an in-plane rotary force applied against at least one of the ends, and (ii) the arcuate element has a width, within the plane of flexure, that is greater than a cross-sectional thickness of the arcuate element perpendicular to the plane of flexure.

16. The method of claim 15, wherein the deformation of the arcuate element is uniform along an entire length thereof.

17. The method of claim 15, wherein the arcuate element has length and a cross-sectional dimension that is non-uniform over the length, whereby stress concentrations are eliminated during displacement due to the force, wherein the cross-sectional dimension is selected from the group consisting of the width within the plane of flexure and the cross-sectional thickness perpendicular to the plane of flexure.

18. The method of claim 17, wherein the cross-sectional dimension monotonically decreases from the first and second ends of the arcuate element to a middle therebetween.

19. The method of claim 18, wherein the monotonic decrease is 60%.

* * * * *